(12) United States Patent
Sundet et al.

(10) Patent No.: US 7,896,940 B2
(45) Date of Patent: Mar. 1, 2011

(54) SELF-SUPPORTING PLEATED FILTER MEDIA

(75) Inventors: Douglas C. Sundet, Hudson, WI (US); Dean R. Duffy, Woodbury, MN (US); Donald E. Young, Forest Lake, MN (US); Lowell E. Christensen, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1069 days.

(21) Appl. No.: 10/887,620

(22) Filed: Jul. 9, 2004

(65) Prior Publication Data

US 2006/0005517 A1    Jan. 12, 2006

(51) Int. Cl.
*B01D 46/00* (2006.01)

(52) U.S. Cl. .............................. 55/486; 55/497; 55/521; 55/524; 55/528

(58) Field of Classification Search .................. 55/497, 55/521, 524, DIG. 39, 486, 487, 511, DIG. 31, 55/528; 210/493.1–493.3
See application file for complete search history.

(56) References Cited

U.S. PATENT DOCUMENTS

| | | | | |
|---|---|---|---|---|
| 3,025,963 A * | 3/1962 | Bauer | ...................... | 210/493.4 |
| 3,165,473 A * | 1/1965 | Pall et al. | .................. | 210/493.1 |
| 3,310,177 A * | 3/1967 | Briggs | ........................ | 210/457 |
| 3,397,793 A * | 8/1968 | MacDonnell | ................ | 210/457 |
| 3,592,767 A * | 7/1971 | Pall | ............................. | 210/490 |
| 3,631,582 A   | 1/1972 | Lucas et al. | | |
| 3,692,184 A * | 9/1972 | Miller et al. | ................ | 210/437 |
| 3,871,851 A * | 3/1975 | Neumann | ..................... | 55/521 |
| 4,547,950 A   | 10/1985 | Thompson | | |
| 4,798,575 A * | 1/1989 | Siversson | .................. | 493/346 |
| 4,917,942 A * | 4/1990 | Winters | ......................... | 96/99 |
| 5,071,555 A * | 12/1991 | Enbom | .................... | 210/493.5 |
| 5,084,178 A   | 1/1992 | Miller et al. | | |
| 5,143,680 A * | 9/1992 | Molnar et al. | ............... | 264/511 |
| 5,397,632 A * | 3/1995 | Murphy et al. | ............. | 442/358 |
| 5,409,766 A * | 4/1995 | Yuasa et al. | ................. | 442/361 |
| 5,496,507 A * | 3/1996 | Angadjivand et al. | ....... | 264/423 |
| 5,531,892 A * | 7/1996 | Duffy | ...................... | 210/493.1 |
| 5,618,324 A * | 4/1997 | Sommer et al. | .............. | 55/497 |

(Continued)

FOREIGN PATENT DOCUMENTS

DE     2 407 329 A1    9/1974

(Continued)

*Primary Examiner*—Duane Smith
*Assistant Examiner*—Ives Wu
(74) *Attorney, Agent, or Firm*—David B. Patchett (57) ABSTRACT

The present invention is a filter that includes a length of filter media and a continuous, substantially nonlinear adhesive strand. The filter media has a front face and a rear face. The filter media has a plurality of pleats defined by a plurality of fold lines, each fold line being intermediate oppositely sloping first and second wall surfaces. The plurality of fold lines comprise a first plurality of pleat tips and a second plurality of pleat valleys. The adhesive strand is provided on the front face of the filter media in discontinuous contact with the filter media. The adhesive strand contacts the filter media at a pleat tip and contacts the filter media at a portion of a first wall surface and contacts the filter media at a portion of a second wall surface.

44 Claims, 5 Drawing Sheets

U.S. PATENT DOCUMENTS

| | | | |
|---|---|---|---|
| 5,792,229 A * | 8/1998 | Sassa et al. | 55/497 |
| 5,804,014 A | 9/1998 | Kähler | |
| 5,922,096 A * | 7/1999 | Stemmer | 55/483 |
| 5,954,962 A * | 9/1999 | Adiletta | 210/490 |
| 6,165,241 A * | 12/2000 | Choi | 55/521 |
| 6,485,544 B1 * | 11/2002 | Ziske | 95/273 |
| 6,521,011 B1 * | 2/2003 | Sundet et al. | 55/499 |
| 6,579,337 B2 * | 6/2003 | Heilmann et al. | 55/495 |
| 6,932,850 B1 * | 8/2005 | Welch et al. | 55/521 |
| 7,097,684 B2 * | 8/2006 | Choi | 55/486 |
| 2001/0020512 A1 * | 9/2001 | Heilmann et al. | 156/205 |
| 2003/0075500 A1 * | 4/2003 | Kleingunther et al. | 210/493.1 |
| 2005/0148266 A1 * | 7/2005 | Myers et al. | 442/401 |

FOREIGN PATENT DOCUMENTS

| | | |
|---|---|---|
| DE | 199 50 067 A1 | 4/2001 |
| JP | 2003093823 A | 4/2003 |

* cited by examiner

SELF-SUPPORTING PLEATED FILTER MEDIA

FIELD OF THE INVENTION

The present invention relates generally to filter media and, more particularly, to a self-supporting pleated filter media including a continuous adhesive strand.

BACKGROUND OF THE INVENTION

The surface area of filter media is a major factor in determining flow resistance (i.e., pressure drop) and loading capacity of a pleated filter. The surface area of a pleated filter media is determined by the size of the pleated filter, the depth of the pleats, and the pleat density. Since the external dimensions of pleated filters are often restricted by the particular application, the number of pleats per inch (pleat density) can be increased to an optimal level to improve filtration performance.

The ability of air filter media to withstand operating pressures is typically dependent upon the pleat count, the pleat depth, the pressure drop of the media, loading capacity of the media, filter frame strength, bonding strength of the media to the frame, and the stiffness of the filter media. The filter media can become unsteady when air pressure is applied to one side. In the event the pleats deform or collapse, a portion of the surface area can be reduced and the pressure drop across the filter element will increase, further increasing the force applied to the filter media. Further, if the tips or peaks of the pleats do not remain in a straight line but instead become wavy, this may cause walls of the pleats to contact one another and to close off some of the surface area of the media. The end result is an increase in pressure drop and a reduction in dust holding capacity.

There is a need for an automated method of manufacturing a pleated filter that has good flow characteristics and exhibits sufficient stability so that the pleats do not collapse or deform when subjected to operating pressure.

BRIEF SUMMARY OF THE INVENTION

The present invention is a filter that includes a length of filter media and a continuous, substantially nonlinear adhesive strand. The filter media has a front face and a rear face. The filter media has a plurality of pleats defined by a plurality of fold lines, each fold line being intermediate oppositely sloping first and second wall surfaces. The plurality of fold lines comprise a first plurality of pleat tips and a second plurality of pleat valleys. The adhesive strand is provided on the front face of the filter media in discontinuous contact with the filter media. The adhesive strand contacts the filter media at a pleat tip and contacts the filter media at a portion of a first wall surface and contacts the filter media at a portion of a second wall surface.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principals of this invention. The figures may not be drawn to scale. Like reference numbers have been used throughout the figures to denote like parts.

DETAILED DESCRIPTION

One embodiment of the present invention is directed to a self-supporting, pleated filter for air filtration, and method of making the same. The method of the present invention provides for assembly of the pleated filter by an automated process at a high rate of manufacturing. The pleated filter of the present invention can be used with or without a reinforcing frame structure. The present method and apparatus may utilize conventional filter media, electret media, or a variety of other media suitable for air filtration, such as for furnace applications.

Figure 1:
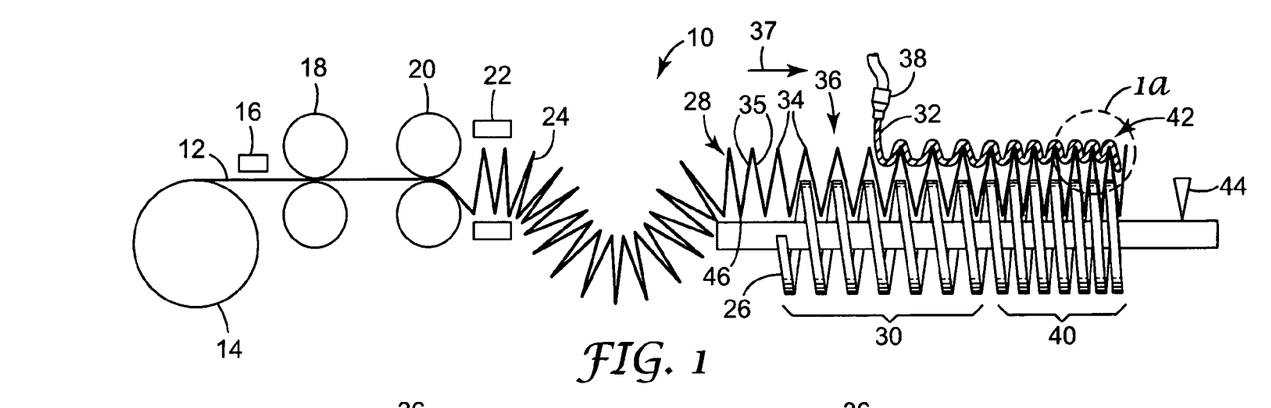
FIG. 1 is a schematic illustration of one embodiment of a system for preforming one embodiment of a method of the present invention.

FIG. 1 is a schematic illustration of one embodiment of system 10 for preforming one embodiment of a method of the present invention. Filter web or filter media 12 is typically provided on roll 14. Filter media 12 may optionally be preheated at heating station 16 to facilitate processing. In one embodiment, heating station 16 is an infrared heater.

A length of filter media 12 is advanced through pleater 18, which in one embodiment is a rotary-score pleater. In one embodiment, filter media 12 is scored at regularly spaced intervals with a conventional scorer or a laser cutter, for example. The scored filter media 12 continues to pleat folding or gathering station 20. Heaters 22 are optionally provided for heat-setting pleats 24. In one embodiment, heaters 22 are infrared heaters. In the illustrated embodiment, pleats 24 are allowed to hang freely before being advanced to pleat spacing device 26. In another embodiment, pleats 24 are retained in an accumulator or trough (not shown) before being advanced to pleat spacing device 26.

Initial pleat formation and pleat spacing may be performed by a variety of methods, such as disclosed in U.S. Pat. No. 4,798,575 (Siversson); U.S. Pat. No. 4,976,677 (Siversson); and U.S. Pat. No. 5,389,175 (Wenz). In one embodiment, pleats 24 are individualized before conveyance to pleat spacing device 26 by a pleat holding device (not shown). In one embodiment, such a pleat holding device includes a paddlewheel for lifting individual pleats and a flighted or toothed conveyor belt for holding the pleats and feeding them onto pleat spacing device 26.

Pleated filter media 28 is disposed in an initial pleat spacing configuration in first zone 30 of pleat spacing device 26. Pleated filter media 28 includes a plurality of pleat tips 34 and sloping side surfaces 35, which are generally perpendicular to the direction of pleating 37. One or more continuous adhesive strands 32 are applied to pleat tips 34 along front face 36 of pleated filter media 28. Adhesive strand 32 may be applied to pleated filter media 28 in first zone 30 of pleat spacing device 26 as shown, or earlier in system 10. For example, adhesive strand 32 may instead be applied to pleated filter media 28 as the media is held by the pleat holding device discussed above. Reference to front face 36 or a rear face is for purposes of description only and does not indicate a required orientation of the pleated filter media 28.

The application of adhesive strand 32 is accomplished by various techniques, including drizzling a continuous bead of molten adhesive 32 onto pleats tips 34 from applicator 38. In one embodiment, adhesive strand 32 is disposed substantially normal to a direction of a pleat fold line. Pleat spacing device 26 is preferably a variable pitch device such as a variable flight or variable pitch screw on a rotating spindle. The pitch variation is preferably gradual and linear from a first end of first zone 30 to a transition point in second zone 40, with a constant pitch at the second end of second zone 40; however, other variation configurations can also be used. After the application of adhesive strand 32 to pleat tips 34, the spacing of pleats 24 is adjusted into a second spaced configuration in second zone 40. In the illustrated embodiment, the pleat spacing is narrowed in second zone 40 compared to first zone 30. This compression of pleat 24 spacing causes the compression of glue strand 32 between pleats 24. In one embodiment, glue strand 32 hardens or cures after the compression in second zone 40. In one embodiment, one or more additional adhesive strands may be used. Such adhesive strands may have the same properties and configuration, or they may differ. An additional adhesive strand may be disposed on top of a previously applied strand or elsewhere on the pleated filter media 28.

Pleat spacing in one embodiment is determined by a distance at the end of second zone 40 (in pleating direction 37) between adjacent pleat tips 34 or the number of pleat tips for a certain length in pleating direction 37. Pleat spacing in the illustrated embodiment at the end of second zone 40 is about 3 to about 6 pleats per 2.54 centimeters (cm) (1.0 inch). In one embodiment, pleat depth or pleat height, measured as a vertical distance between pleat tips 34 and pleat valleys 46, is generally between about 1.27 cm and about 15.2 cm (0.5 inch to 6.0 inches) and is more preferably slightly less than about 2.54 cm (1.0 inch), slightly less than about 5.08 cm (2.0 inches), or slightly less than about 10.16 cm (4.0 inches), so that pleated filter media 28 fits into a 1 inch nominal, a 2 inch nominal, or a 4 inch nominal filter track. In one embodiment, the pleat height is about 1.8 cm (0.7 inch). While pleat tips 34 and pleat valleys 46 are illustrated with sharp folds, it is also contemplated that they may instead constitute more curved configurations, leading to a sinusoidal shaped pleating of filter media 12.

The stiffness of filter media 12 is a factor in determining the suitability of a particular filter media for use in the present invention. A Taber V-5 Stiffness Tester, Model 150-B, made by Teledyne Taber of North Tonawanda, N.Y., can be used to evaluate the stiffness of the filter media. The V-5 stiffness tester operates by bending a specimen about 38.1 millimeters wide by about 38.1 millimeters long (1.5 inches by 1.5 inches) to a prescribed angular of deflection and measuring the force, in stiffness units ranging from 0-10, used to obtain this deflection. In many heating, ventilating and air conditioning (HVAC) applications, the air pressure is generally about 50 Pascal (Pa) to about 350 Pa (0.2 to 1.4 inch water column (w.c.)) and the face velocity is approximately 91.5-152.4 meters per minute (m/min) (300-500 feet per minute (ft/min)). For HVAC filtration applications, the minimum stiffness value is preferably greater than about 1.2 stiffness units, more preferably greater than about 1.5 stiffness units and even more preferably greater than about 2 stiffness units.

Filter media 12 may be paper; porous films of thermoplastic or thermoset materials; nonwoven, such as melt blown or spunbond, webs of synthetic or natural fibers; scrims; woven or knitted materials; foams; electret or electrostatically charged materials; fiberglass media; or laminates or composites of two or more materials. A nonwoven polymeric web of polyolefin, polyethylene or polypropylene is suitable, for example. Filter media 12 may also include sorbents, catalysts, and/or activated carbon (granules, fibers, fabric, and molded shapes). Electret filter webs can be formed of the split fibrillated charged fibers as described in U.S. Pat. No. RE 30,782. These charged fibers can be formed into a nonwoven web by conventional means and optionally joined to a supporting scrim such as disclosed in U.S. Pat. No. 5,230,800 forming an outer support layer. Alternatively, filter media 12 can be a melt blown microfiber nonwoven web, such as disclosed in U.S. Pat. No. 4,813,948 which can be joined to a support layer during web formation as disclosed in that patent, or subsequently joined to a support web in any conventional manner.

A particularly suitable media is a corona-treated spunbond polyethylene/polypropylene twinned fiber, commercially available from Kimberly Clark Corporation under the designation Accuair. This media has a basis weight of about 71 grams per square meter ($g/m^2$) and a filament diameter of about 20 micrometers. Another suitable media is a blown polypropylene microfiber having a basis weight of about 10 $g/m^2$ to about 80 $g/m^2$ and an average filament diameter of about 2 micrometers to about 17 micrometers. For a commercial air purifier application example, filter media 12 is preferably a blown polypropylene microfiber having a basis weight of about 20 $g/m^2$ to about 40 $g/m^2$ and an average filament diameter of about 2 micrometers. For an example commercial HVAC filter of 51 mm (2 inch) nominal frame depth and 61 cm (2 feet) by 61 cm (2 feet) size, filter media 12 is preferably a blown polypropylene microfiber having a basis weight of about 30 $g/m^2$ and an average filament diameter of about 5 micrometers to about 7 micrometers. In one embodiment, filter media 12 is between about 0.5 millimeter (mm) and about 1.0 mm thick and is about 0.8 mm thick in a preferred example. The present invention is particularly suitable for use with nonwoven polymeric media, which are typically softer than fiberglass media, for example. Adhesive strand 32 helps to retain pleat sharpness and spacing in these softer materials.

Laminated media can also be used as filter media 12. Such media may consist of laminated layers of the media discussed above or of other substrates laminated to one or more layers of filter media, for example. Such lamination can be accomplished by conventional hot melt lamination methods using about 3 $g/m^2$ to about 6 $g/m^2$ of a hot melt adhesive such as a polypropylene based hot melt adhesive. A suitable machine for achieving such lamination is available from ITW Dynatec, Hendersonville, Tenn. The adhesive is preferably applied in a discontinuous pattern to minimize blockage of the surface of filter media 12. In one embodiment, a pre-filter layer with a basis weight of about 60 $g/m^2$ to about 90 $g/m^2$ is used on the upstream side of filter media 12. Such a pre-filter layer consists of polypropylene, polyethylene, polyethylene terephthalate, or blends of these materials, in one example. In one embodiment, an additional scrim layer may be used to offer added protection to the downstream side of filter media 12. Such a scrim layer typically has a basis weight of about 10 g/m$^2$ to about 15 g/m$^2$ and consists of nonwoven polypropylene, polyethylene, polyester based polymers, or blends of these materials, in one example.

Adhesive strand 32 may be composed of a wide range of suitable adhesives which bond to filter media 12 and offer structural support to the media. In some embodiments, hot-melt and foamed hot-melt adhesives are preferred because they can easily be applied to pleat tips 34 in a molten state and then cured, hardened, or cross-linked after the pleat spacing is changed, thereby acting as spacers to maintain the final pleat spacing. A particularly suitable hot melt adhesive is an adhesive having between about 5% and about 10% paraffin wax and between about 10% and about 30% polyethylene wax. In one embodiment, the adhesive has a viscosity of about 5,600 centipoise (cP) at 121.1° C. (250° F.). Another suitable adhesive is available from 3M Company under product number 3748; it has a viscosity of about 5,000 cP (Brookfield Thermosel Viscometer in Centipoise) at 190.6° C. (375° F.). Yet another suitable adhesive is an ethyl vinyl acetate based hot melt adhesive with a viscosity of about 10,500 cP at 148.9° C. (300° F.). In one embodiment, a suitable adhesive has a set rate of less than about 3 minutes for a 3.18 mm (⅛ inch) diameter bead and preferably has a set rate of less than about 45 seconds.

In one embodiment, applicator 38 is part of a Nordson Grid Melter system with a tank temperature between about 110° C. (230° F.) and 125° C. (257° F.) and preferably at about 120° C. (248° F.). The hose and head temperatures are preferably between about 99° C. (210° F.) and 177° C. (350° F.); more preferably between about 102° C. (216° F.) and 106° C. (223° F.); and most preferably at about 104° C. (219° F.). Applicator 38 has a nozzle with an orifice size between about 1.14 mm (0.045 inch) and about 1.91 mm (0.075 inch) and preferably at about 1.52 mm (0.060 inch). The orifice of applicator 38 is positioned between about 0.5 mm (0.02 inch) and about 4.0 mm (0.16 inch) and preferably at about 2.0 mm (0.08 inch) above pleat tips 34.

In one embodiment, a pleat height is about 18 mm (0.71 inch). Applicator 38 applies adhesive strand 32 to pleat tips 34 at an initial spacing in first zone 30 of between about 7.2 mm (0.28 inch) and about 23.4 mm (0.92 inch) between adjacent pleat tips 34; more preferably, the initial spacing is between about 10.8 mm (0.43 inch) and about 18.0 mm (0.71 inch). Because adhesive strand 32 is molten and applied to already-formed pleats 24, the adhesive causes essentially no resistance to pleat formation. In one embodiment, in first zone 30, a ratio between pleat spacing and pleat height is between about 0.4 and about 1.3, with a preferred ratio between about 0.6 and 1.0. These ratios can be used to determine suitable pleat spacings for other pleat heights. In one embodiment, adhesive strand 32 is applied as a continuous adhesive strand. This allows for ease of application, the use of simpler control modules, increased reliability and lower cost.

After application of adhesive strand 32, pleats 24 are compressed in second zone 40 to a second spacing of between about 1.8 mm (0.07 inch) and about 12.6 mm (0.50 inch) between adjacent pleat tips 34; more preferably, the second spacing is between about 2.7 mm (0.11 inch) and about 9 mm (0.35 inch); even more preferably, the second spacing is between about 4 mm (0.16 inch) and about 7 mm (0.28 inch). In one embodiment, in second zone 40, a ratio between pleat spacing and pleat height is between about 0.10 and about 0.70, with a preferred ratio between about 0.15 and 0.50. It is contemplated that variations to the described materials and conditions can be used to achieve pleated media with other appearances, bridging effects, and pleat pack stabilization effects.

The combination of pleated filter media 28 and adhesive strands 32 form self-supporting pleated media 42. In one embodiment, self-supporting pleated media 42 is cut to a desired length by cutting station 44.

Figure 1A:
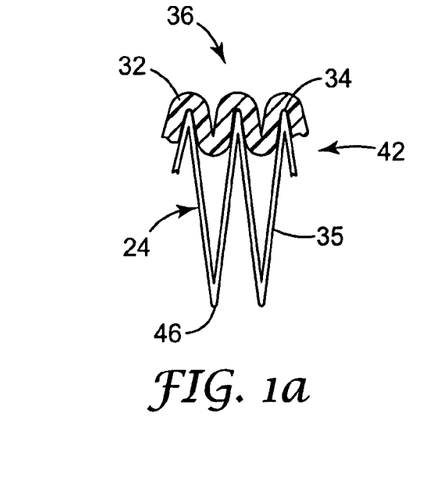
FIG. 1a is an enlarged, partial side elevation view of a first embodiment of filter media, produced by the system of FIG. 1.

FIG. 1*a* is an enlarged, partial side elevation view of one embodiment of self-supporting pleated media 42, produced by the system of FIG. 1. A plurality of fold lines in self-supporting pleated media 42 alternately constitute pleat tips 34 and pleat valleys 46. Each fold line is intermediate oppositely sloping wall surfaces 35. Compression of adhesive strand 32 and gravity cause the adhesive to travel downward on sloping walls 35 toward an inside surface of valley 46 so that strand 32 is substantially nonlinear in the viewed side elevation dimension. Adhesive strand 32 thereby lends rigidity, structural integrity and dimensional stability to each pleat 24 so that self-supporting pleated media 42 is better suited to machine handling in subsequent processing and maintains its original form during use. Adhesive strand 32 maintains pleat spacing and prevents pleat collapse.

In a preferred embodiment, adhesive strand 32 does not reach an inside surface of valley 46 and is thereby in discontinuous contact with filter media 12. Therefore, the shape of pleat 24 is not deformed by an excess of adhesive 32, adhesive 32 blocks less surface area of filter media 12, and cost savings are achieved by using less adhesive 32. The stiffness of filter media 12, the setting properties of adhesive 32, and settings of system 10 are preferably chosen so that hardened or cured adhesive 32 maintains the shape of pleats 24 in second zone 40 of pleat spacing device 26 without causing pleat shape deformation.

Figure 1B:
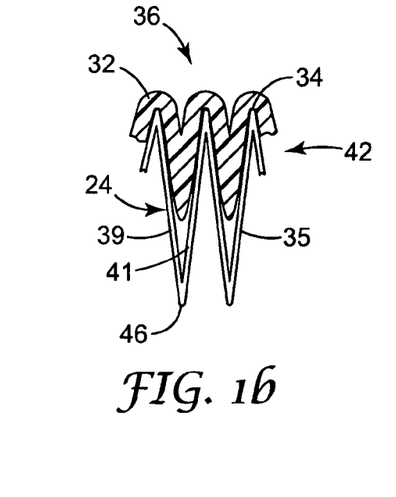
FIG. 1b is an enlarged, partial side elevation view of a second embodiment of self supporting pleated media 42, produced by the system of FIG. 1.

FIG. 1*b* is an enlarged, partial side elevation view of a second embodiment of self-supporting pleated media 42, produced by the system of FIG. 1. In the illustrated embodiment, adhesive 32 and processing conditions are selected so that adhesive strand 32 travels further downward on sloping walls 35 toward an inside surface of valley 46. For example, an adhesive with lower viscosity or a longer set rate may be selected, the temperature at nozzle 38 may be higher, a wider initial pleat spacing in first zone 30 may be used, or the line speed of system 10 may be decreased. In the illustrated embodiment, adhesive strand 32 bonds to pleat tips 34 and a major portion of sloping walls 35. Adhesive strand 32 thereby lends rigidity, structural integrity and dimensional stability to each pleat 24 so that self-supporting pleated media 42 is better suited to machine handling in subsequent processing and maintains its original form during use. Adhesive strand 32 maintains pleat spacing and prevents pleat collapse.

In a preferred embodiment, adhesive strand 32 does not reach an inside surface of valley 46 and is thereby in discontinuous contact with filter media 12; therefore, the shape of pleat 24 is not deformed by an excess of adhesive 32. In another embodiment, adhesive strand 32 does reach an inside surface of valley 46 so that strand 32 is in continuous contact with filter media 12. In the illustrated embodiment, a portion of adhesive strand 32 on a first wall surface 39 contacts a portion of adhesive strand 32 on a second wall surface 41 to form a finger that acts as a spacer and structural reinforcer for pleats 24. In one embodiment, these portions of adhesive strand 32 cure together. In another embodiment, the sections of adhesive strand 32 may partially cure individually before coming into contact, thereby forming a knit line at the interface between the two sections. The depth of travel of adhesive strand 32 toward an inside surface of valley 46 is determined by a number of factors, including, for example, the adhesive setting properties, the amount of adhesive used relative to the pleat spacing, the temperature at nozzle 38, the width of initial pleat spacing in first zone 30, the line speed of system 10 in direction of pleating 37, and air temperature and flow rate. The stiffness of filter media 12, the setting properties of adhesive 32, and settings of system 10 are preferably chosen so that hardened or cured adhesive 32 maintains the shape of pleats 24 in second zone 40 of pleat spacing device 26 without causing pleat shape deformation.

Figure 2:
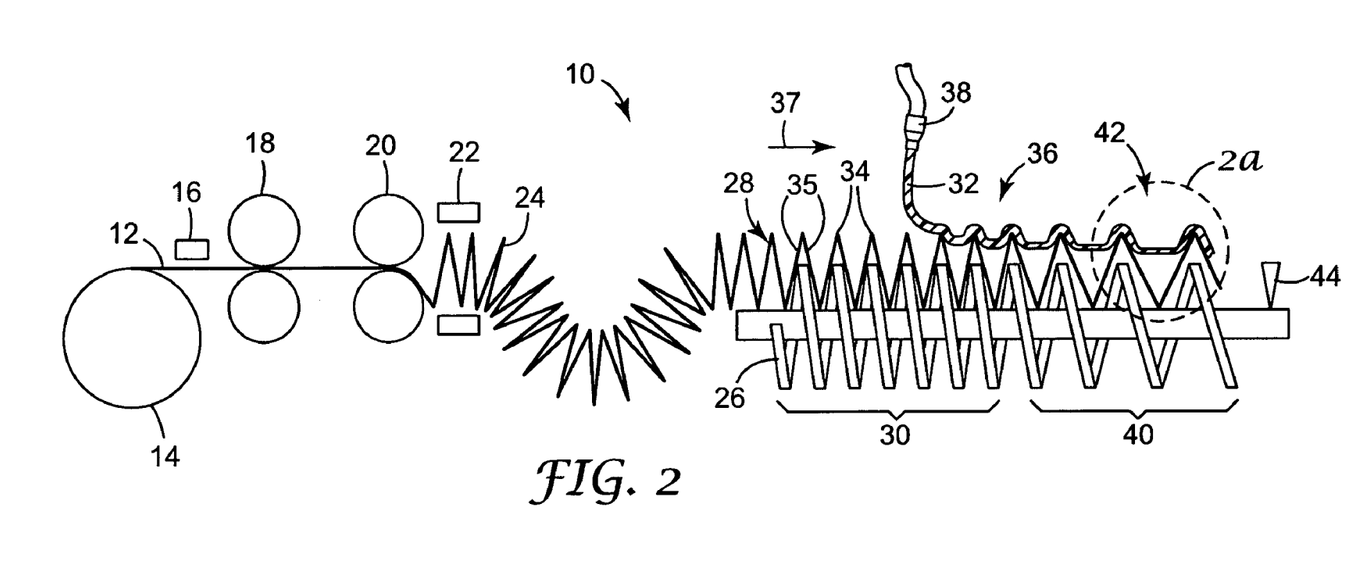
FIG. 2 is a schematic illustration of a second embodiment of a system for preforming a second embodiment of a method of the present invention.

FIG. 2 is a schematic illustration of a second embodiment of system 10 for preforming a second embodiment of a method of the present invention. The steps for forming pleats 24 described relative to FIG. 1 are the same as those used relative to this second embodiment. After the application of adhesive strand 32 to pleat tips 34 in first zone 30, the spacing of pleats 24 is widened in second zone 40 compared to first zone 30. This widening of pleat 24 spacing causes a drawing or bridging of partially cooled or hardened adhesive strand 32 between pleats 24. This is possible because the adhesive has greater strength in a partially cooled state as compared to the molten state. In one embodiment, adhesive strand 32 hardens or cures completely after the widening in second zone 40, thereby forming a pleat spacer. Adhesive 32 and processing conditions are selected to achieve the bridging effect. For example, an adhesive with higher viscosity or a faster set rate may be selected or the temperature at nozzle 38 may be lower, for example. Additional adhesive strands can be used if additional beam strength is required. These additional strands can be applied concurrently with strand 32 or after strand 32 has cooled. In one embodiment, an additional adhesive strand is applied on top of strand 32 in or after second zone 40. In one embodiment, one or more other adhesive strands may be used. Such adhesive strands may have the same properties and configuration, or they may differ. An additional adhesive strand may be disposed on top of a previously applied strand or elsewhere on the pleated filter media 28.

In one embodiment, a pleat height is about 18 mm (0.71 inch). Applicator 38 applies adhesive strand 32 to pleat tips 34 at an initial spacing in first zone 30 of between about 1.8 mm (0.07 inch) and about 7.2 mm (0.28 inch) between adjacent pleat tips 34; more preferably, the initial spacing is between about 3.6 mm (0.14 inch) and about 5.4 mm (0.21 inch). In one embodiment, in first zone 30, a ratio between pleat spacing and pleat height is between about 0.1 and about 0.4, with a preferred ratio between about 0.2 and about 0.3. These ratios can be used to determine suitable pleat spacings for other pleat heights. In one embodiment, adhesive strand 32 is applied as a continuous adhesive strand. This allows for ease of application, the use of simpler control modules, increased reliability and lower cost. After application of adhesive strand 32, pleats 24 are widened in second zone 40 to a second spacing of between about 3.6 mm (0.14 inch) and about 27.0 mm (1.06 inch) between adjacent pleat tips 34; more preferably, the second spacing is between about 5.4 mm (0.21 inch) and about 18.0 mm (0.71 inch). In one embodiment, in second zone 40, a ratio between pleat spacing and pleat height is between about 0.2 and about 1.5, with a preferred ratio between about 0.3 and about 1.0. It is contemplated that variations to the described materials and conditions can be used to achieve pleated media with other appearances, bridging effects, and pleat pack stabilization effects.

Figure 2A:
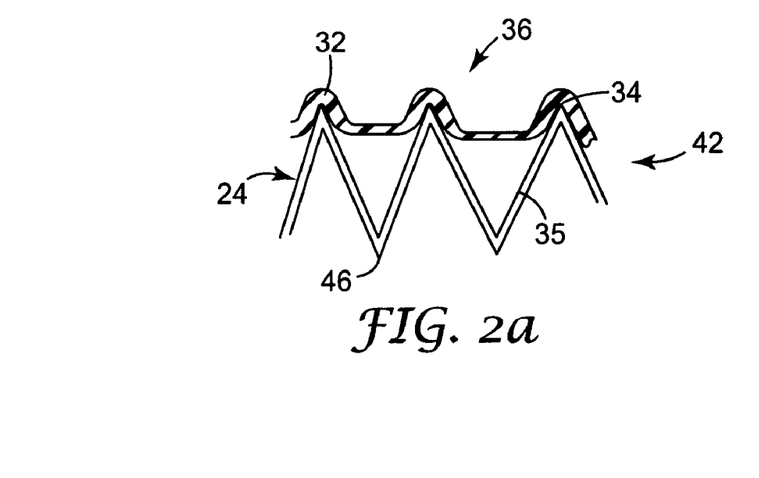
FIG. 2a is an enlarged, partial side elevation view of a second embodiment of filter media, produced by the system of FIG. 2.

FIG. 2a is an enlarged, partial side elevation view of a second embodiment of self-supporting pleated media 42, produced by the system of FIG. 2. Bridging of adhesive strand 32 causes the adhesive to stretch between adjacent pleat tips 34. After such stretching, adhesive strand 32 hardens or cures, thereby maintaining the widened pleat spacing of self-supporting pleated media 42. Because the final pleat spacing is not dependent solely on the thickness of adhesive strand 32, the illustrated embodiment accomplishes this objective with minimal adhesive use and therefore with minimal air flow restriction due to the presence of adhesive strand 32 blocking portions of sloping side surfaces 35 of filter media 12. The stiffness of filter media 12, the setting properties of adhesive 32, and settings of system 10 are preferably chosen so that hardened or cured adhesive 32 maintains the shape of pleats 24 in second zone 40 of pleat spacing device 26 without causing pleat shape deformation. For example, if particularly soft filter media 12 are used, the settings and materials of system 10 can be selected so that adhesive strand 32 extends more deeply down pleat walls 35, thereby lending greater strength to self-supporting pleated media 42. As illustrated by FIGS. 1a and 2a, system 10 of the present invention can be used to produce self-supporting pleated media 42 with both very close pleat spacings and very wide pleat spacings.

Figure 3:
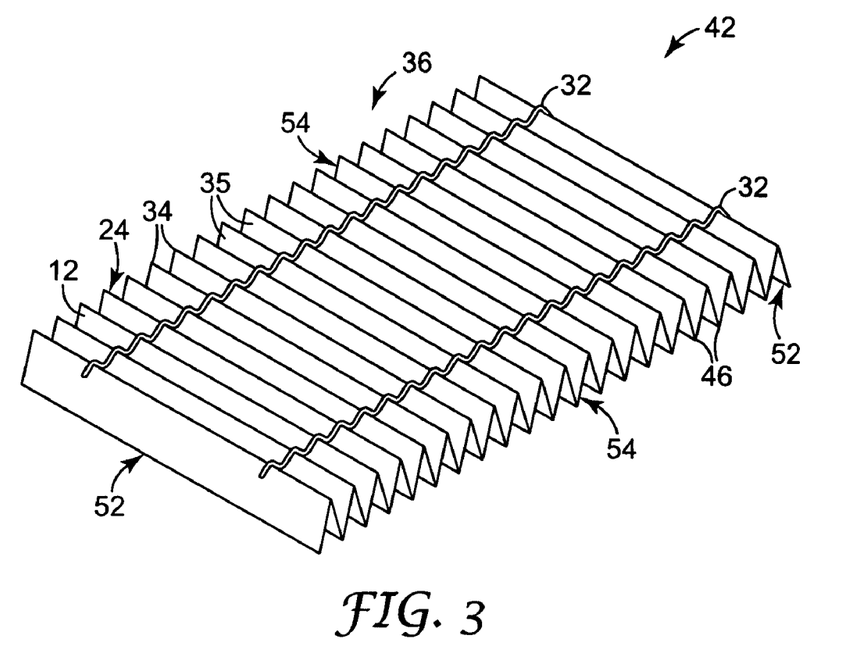
FIG. 3 is a perspective view of a front face of one embodiment of filter media produced by the system of FIG. 1 or FIG. 2.

FIG. 3 is a perspective view of front face 36 of one embodiment of self-supporting pleated media 42 produced by system 10 of FIG. 1 or FIG. 2. In one embodiment of system 10, a plurality of applicators 38 dispense a plurality of parallel adhesive strands 32 onto self-supporting pleated media 42; in one embodiment, strands 32 are positioned at regular intervals. In one embodiment, adjacent adhesive strands 32 are placed between about 2.5 cm (1 inch) to about 15.2 cm (6 inches) apart and are more preferably placed between about 5.1 cm (2 inches) to about 10.2 cm (4 inches) apart. Adhesive strands 32 provide dimensional stability to pleats 24 of pleated filter media 28. Thus, self-supporting pleated media 42 can be used in filtration applications, with or without a frame structure, or as an insert into a permanent or reusable frame. Pleated filter media 28 and adhesive strands 32 form a self-supporting pleated media 42 that can be cut, machined handled or otherwise processed. In embodiments where the self-supporting pleated media 42 is used without frame members, the self-supporting pleated media 42 exits system 10 after the cutting station 44 such that media 42 is characterized by the absence of a nonlinear adhesive strand in contact with pleat valleys on the back face (opposite front face 36) of media 42. Self-supporting pleated media 42 is preferably sufficiently strong so that pleats 24 do not collapse or bow excessively when subjected to the air pressure typically encountered in forced air ventilation systems.

The cut self-supporting pleated media 42 section has opposite end edges 52 and opposite side edges 54. For HVAC applications, the length and width of cut self-supporting pleated media 42 is typically from about 30.5 centimeters wide by about 30.5 centimeters long (12 inches by 12 inches); to about 61.0 centimeters wide by about 61.0 centimeters long (24 inches by 24 inches); to about 50.8 centimeters wide by about 76.2 centimeters long (20 inches by 30 inches). Self-supporting pleated media 42 is usually cut into square or rectangular shapes, though other sizes and configurations are possible.

Figure 4:
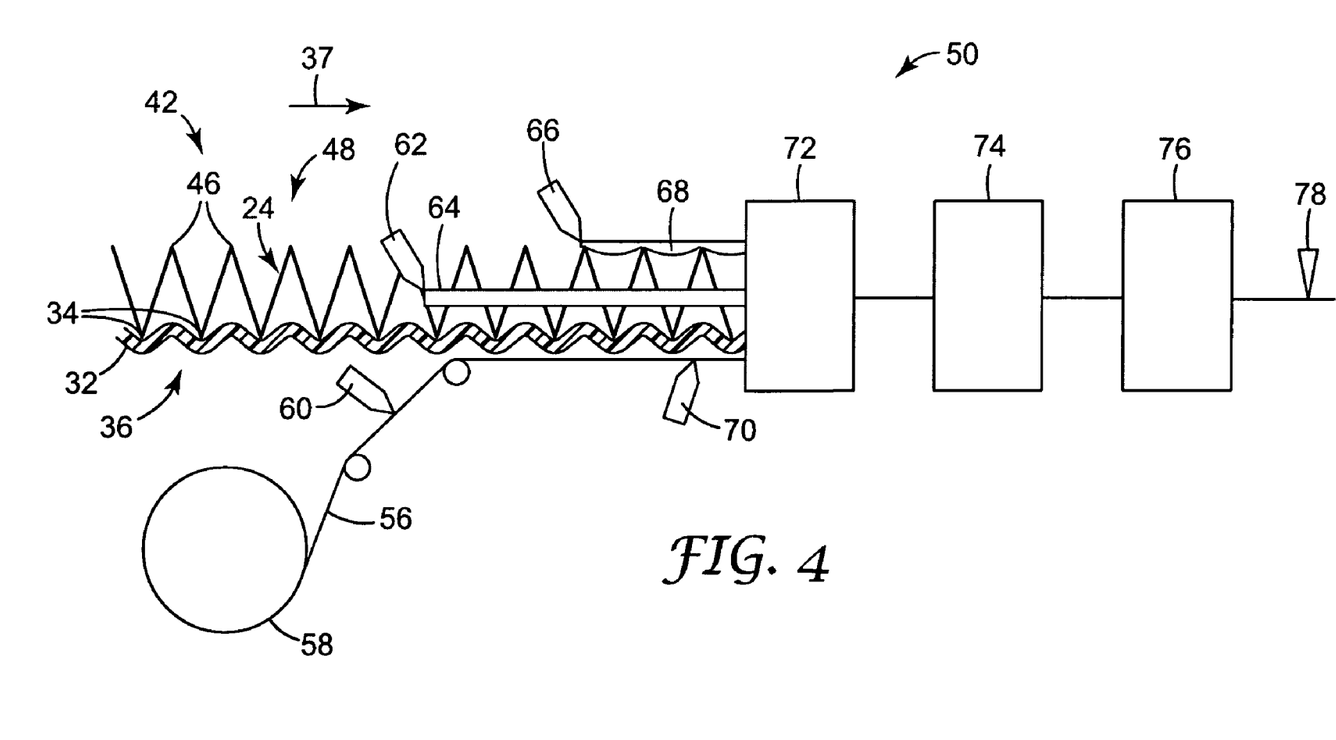
FIG. 4 is a schematic illustration of a one embodiment of a system for further processing the media produced by the system of FIG. 1 or FIG. 2.

FIG. 4 is a schematic illustration of a one embodiment of system 50 for further processing self-supporting pleated media 42 produced by system 10 of FIG. 1 or FIG. 2. Self-supporting pleated media 42 can be used without a frame or inserted into a permanent frame that permits self-supporting pleated media 42 to be easily changed. Alternatively, reinforcing or frame members are optionally applied for some filtration applications. The step of applying the frame members typically includes positioning a portion of the frame members onto a portion of the front face and the rear face of the filter media. An adhesive is typically applied between the perimeter of the filter media and the frame members. The method may be performed using a fully automated system. A suitable system and method are disclosed in U.S. Pat. App. Pub. No. 2003/0172633 (Duffy).

In the illustrated system 50, self-supporting pleated media 42 is flipped from the orientation shown with respect to system 10, so that rear face 48 faces upward. In one embodiment, a continuous strip of frame material 56 from roll 58 is applied to opposite sides 54 (shown in FIG. 3) of the self-supporting pleated media 42 section parallel to the direction of pleating 37. Frame material 56 is typically composed of paper products, such as chipboard, or polymeric or metallic materials. An adhesive, such as a hot melt adhesive, is applied to a first flange of a U-shaped channel formed from the frame material 56 at nozzle 60. Nozzle 60 can apply single or multiple adhesive beads or coatings to the flanges, fold lines, and/or main body of frame material 56, or any combination thereof, prior to application and bonding of frame material 56 to pleats 24 to form a U-shaped channel frame. While the use of nozzles is described, other applicators may also be used, such as belt or roller systems.

In one embodiment, an additional adhesive for sealing the side ends of pleats 24 is applied by side glue applicator 62 to form substantially linear side band glue strip 64. In an unillustrated embodiment, side band glue strip 64 can also extend the entire height of pleats 24 or beyond. In one embodiment, an additional adhesive for reinforcing the self-supporting pleated media 42 on rear face 48 is applied by tip glue applicator 66 to form substantially linear tip glue strip 68. Side band glue strip 64 and tip glue strip 68 are formed from any suitable adhesive using conventional materials and methods known in the art. In one embodiment, each of side glue applicator 62 and tip glue applicator 66 are transfer bands or belts. An adhesive for forming either side band glue strip 64 or tip glue strip 68 is applied to a band made of a material such as metal or silicone rubber. The adhesive at least partially cools on the band. Then, the cooled adhesive is transferred onto self-supporting pleated media 42 and pressed thereon to adhere the side band glue strip 64 or tip glue strip 68 onto self-supporting pleated media 42. Unlike adhesive strands 32, side band glue strip 64 and tip glue strip 68 are applied to self-supporting pleated media 42 after the spacing of pleats 24 has been set. Moreover, the adhesive for side band glue strip 64 and tip glue strip 68 are not applied directly to filter media 12, but are first applied to a transfer mechanism and then transferred onto filter media 12. Also, side band glue strip 64 and tip glue strip 68 are preferably formed of relatively high viscosity adhesives or substantially set adhesives that remain in a linear configuration as applied and exhibit minimal conformation to the shape of filter media 12.

Other reinforcing members and techniques can also be used, as disclosed in U.S. Pat. No. 6,521,011 (Sundet et al.). Moreover, reinforcing members may be positioned in any orientation relative to self-supporting pleated media 42. For example a net or scrim material may be applied to front face 36 of pleated filter media 28 after the application of adhesive strand 32. Such a scrim would readily bond to the adhesive on top of pleat tips 34.

In one embodiment, after the application of suitable reinforcement members, a hot melt adhesive is applied to the second flange of the U-shaped channel of frame material 56 at nozzle 70 (shown schematically only; the actual orientation may vary in practice). Frame material 56 is bent into its U-shaped configuration at frame bending station 72 so that the ends of the U-shaped channel extend partially onto the front face 36 and rear face 48 of the self-supporting pleated media 42 (see FIG. 6).

The U-shaped channel of the side frame members serve to further stabilize the self-supporting pleated media 42 and to seal the ends of pleats 24 to prevent air bypass in the final pleated filter. In one embodiment, a viscous adhesive such as a foamed adhesive, a filled adhesive or a caulk is used to seal the ends of pleats 24 to the frame members. Latex caulk is well suited for this purpose since it is low cost and has low volatile organic content. On the other hand, latex caulks have a long set time. Therefore, other adhesives, such as hot melt adhesives, are utilized in one embodiment to bond the two sides of the U-shaped channel formed from the frame material 56 to the pleat tips 34. A variety of techniques may be used for applying the frame members to self-supporting pleated media 42, such as disclosed in U.S. Pat. No. 4,731,047 (Lobb) and U.S. Pat. No. 6,406,509 (Duffy).

The self-supporting pleated media 42 and side frame members are rotated 90 degrees at rotation station 74 to permit application of the end frame members at a framing station 76. Alternatively, the frame members can be configured as two box structures that are positioned over the front and rear faces 36, 48, respectively, of the self-supporting pleated media 42, with overlapped circumferential portions, such as disclosed in U.S. Pat. No. 5,782,944 (Justice). In another embodiment, the frame members can be configured as a one-sided die-cut frame that is folded around the self-supporting pleated media 42.

An assembly including the web of self-supporting pleated media 42 and attached frame material 56 is cut at cutting station 78 to desired lengths. Alternatively, self-supporting pleated media 42 with reinforcing side band glue strips 64 and reinforcing tip glue strips 68 can be cut to size before application of frame material 56.

Rather than using the illustrated system 50, rear face 48 may be left untreated, or other treatments can alternatively be used for rear face 48. For example, rather than using reinforcing strips of adhesive 64, 68, reinforcing strips or members may be constructed from various plastic, paper or chipboard products; polymeric materials; or metals. In order to minimize pressure drop across the self-supporting pleated media 42, the reinforcing materials can be configured as strips, films, scrims, meshes, nets, strands, filaments, or other porous structures such as perforated sheets, for example. In one embodiment, the reinforcing structure includes one or more reinforcing members extending in the direction of pleating generally along the contour of the pleat tips and sloping side surfaces of the rear face. In one embodiment, the reinforcing members are bonded to pleat tips 34 of the filter media 12.

Figure 5:
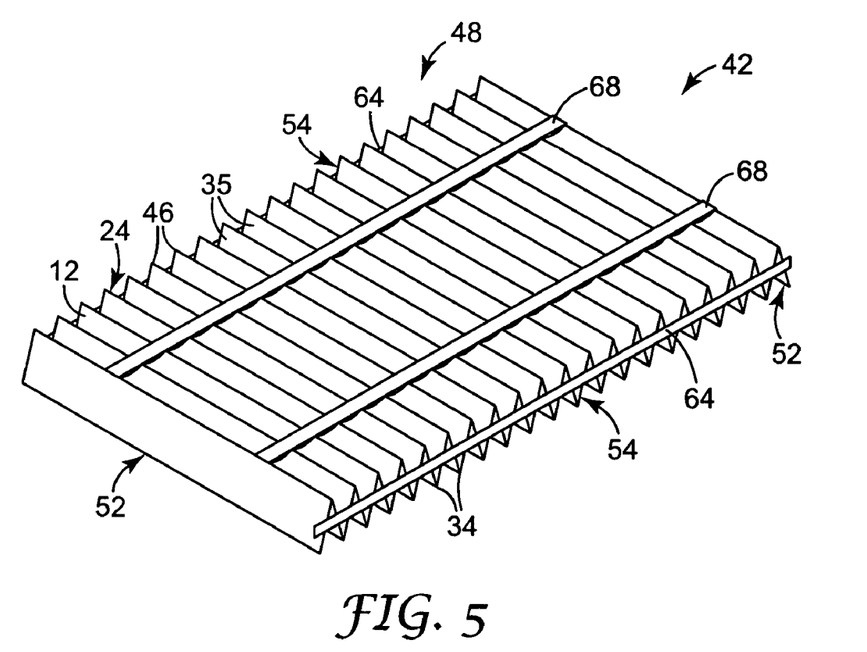
FIG. 5 is a perspective view of a rear face of one embodiment of filter media produced by the system of FIG. 1 or FIG. 2.

FIG. 5 is a perspective view of rear face 48 of one embodiment of self-supporting pleated media 42 produced by a variation of system 50. In the illustrated embodiment, self-supporting pleated media 42 has not been framed, but has been processed to include side band glue strips 64 and tip glue strips 68.

Figure 6:
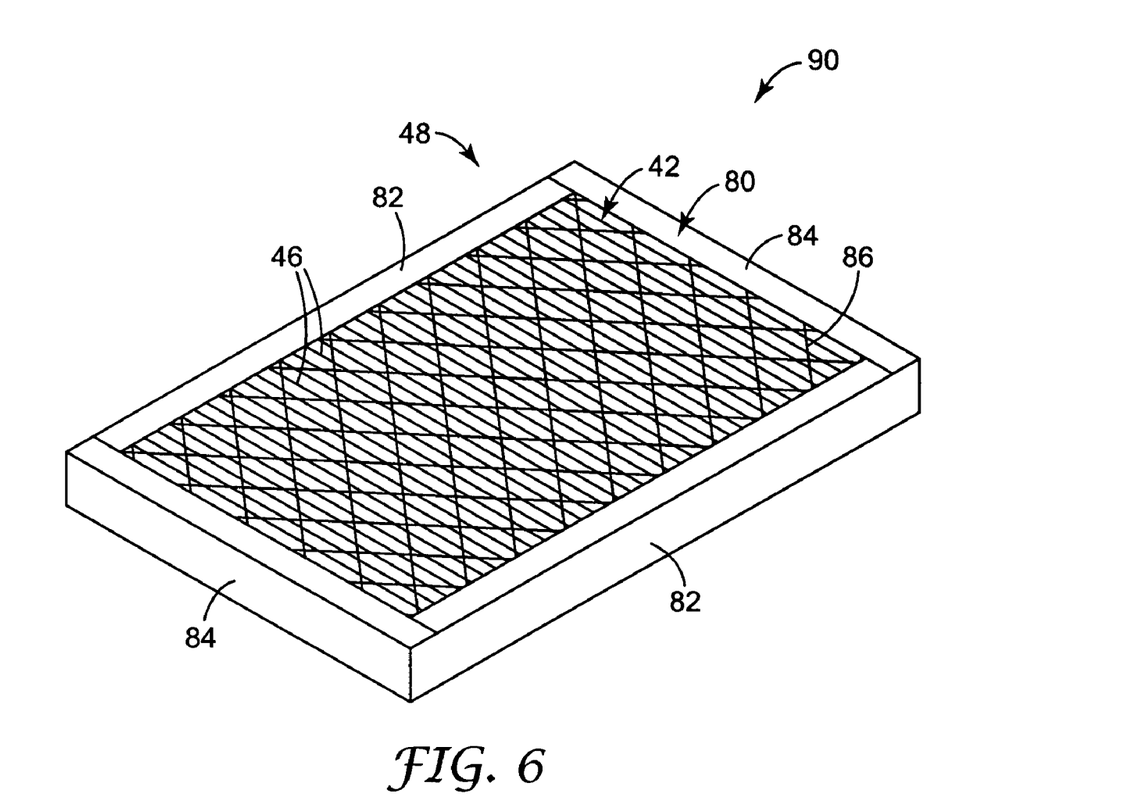
FIG. 6 is a perspective view of one embodiment of filter media disposed within a frame.

FIG. 6 is a perspective view of one embodiment of pleated filter 90, including self-supporting pleated media 42 disposed within frame 80. Frame 80 consists of U-shaped side frame channel members 82 and U-shaped end frame channel members 84. In one embodiment, each frame channel member 82, 84 covers an edge 54, 52 (see FIG. 5) and at least a portion of front face 36 and rear face 48. In the illustrated embodiment, a planar reinforcing member in the form of metal mesh scrim 86 is disposed extending substantially across the entire rear face 48. Scrim 86 is bonded to pleat tips 34 to provide dimensional stability to pleated filter 90.

In one embodiment, scrim 86 is a galvanized steel expanded wire mesh laminated to pleat tips 34 with a hot melt adhesive. The wire mesh is about 0.25 mm (0.010 inch) thick, the diamond-shaped openings are about 25.4 mm (1.0 inch) by about 19.1 mm (0.75 inch), and the strands are about 0.30 mm (0.012) inch wide. A suitable wire mesh is available from Wallner Tooling/Expac, Inc. The wire mesh is coated with hot-melt adhesive using a conventional roll coater where the application roll is partially submerged in the melted hot melt adhesive. As the roll rotates, it picks up a coating of hot melt adhesive, which is transferred to the expanded wire as the wire comes into contact with the roll. While the adhesive is still semi-molten, the wire is placed into contact with pleat tips 34, making bonds where the coated wire contacts pleat tips 34. Because of the high number of bonding points, scrim 86 aids in maintaining proper pleat spacing and preventing buckling or collapse of pleats 24. Use of scrim 86 may be used in combination with, or in place of, any of the reinforcing members discussed herein. For example, with reference to FIG. 4, an applicator may be used to apply adhesive for adhering scrim 86 rather than for applying tip glue strip 68. Moreover, a scrim may be applied to front face 36 as well as or in place of a scrim applied to rear face 48.

One embodiment of pleated filter 90 constructed according to the above disclosure was tested according to ASHRAE 52.2. The initial pressure drop was about 0.18 inch w.c. and the E1, E2 and E3 minimum composite efficiencies were about 61%, about 88% and about 97%, respectively. Pleated filter 90 possessed sufficient support to allow loading to about 1.0 inch w.c.

The complete disclosures of all patents, patent applications, and publications are incorporated herein by reference as if individually incorporated. Although the present invention has been described with reference to preferred embodiments, workers skilled in the art will recognize that changes may be made in form and detail without departing from the spirit and scope of the invention, and it should be understood that this invention is not to be unduly limited to the illustrative embodiments set forth herein. For example, the teachings herein may be combined with conventional methods and articles to form new combinations of features.

The invention claimed is:

1. A filter comprising:
a length of blown electret polypropylene microfiber filter media having a minimum stiffness greater than 1.2 stiffness units and defining a front face and a rear face, the filter media having a plurality of pleats defined by a plurality of fold lines, each fold line being intermediate oppositely sloping first and second wall surfaces, wherein the plurality of fold lines comprise a first plurality of pleat tips and a second plurality of pleat valleys; and
a continuous, substantially nonlinear adhesive strand provided on the front face of the filter media in discontinuous contact with the filter media, wherein the adhesive strand contacts the filter media at the first plurality of pleat tips and contacts the filter media along a majority of a length of a first wall surface and along a majority of a length of a second wall surface.

2. The filter of claim 1 wherein the filter media comprises a laminate material.

3. The filter of claim 1 wherein the filter media comprises a nonwoven polymeric material.

4. The filter of claim 1 wherein the adhesive strand does not contact the filter media in a valley.

5. The filter of claim 1 wherein a distance between a pleat tip and an adjacent pleat tip is between about 1.8 mm and about 12.6 mm.

6. The filter of claim 1 wherein a distance between a pleat tip and an adjacent pleat tip is between about 3.6 mm and about 27.0 mm.

7. The filter of claim 1 wherein a distance between a pleat tip and an adjacent pleat tip defines a pleat spacing, and wherein a ratio between pleat spacing and pleat height and is between about 0.1 and about 0.7.

8. The filter of claim 1 wherein a distance between a pleat tip and an adjacent pleat tip defines a pleat spacing, and wherein a ratio between pleat spacing and pleat height and is between about 0.2 and about 1.5.

9. The filter of claim 1 wherein a portion of the adhesive strand on a first wall surface contacts a portion of the adhesive strand on a second wall surface.

10. The filter of claim 1, further comprising a plurality of continuous adhesive strands.

11. The filter of claim 10, wherein the plurality of adhesive strands are positioned parallel to, and spaced apart from, each other.

12. The filter of claim 11, wherein an adhesive strand is spaced from an adjacent adhesive strand by between about 2.5 cm and about 12.7 cm.

13. The filter of claim 1 wherein the filter media further comprises a side edge, the side edge being substantially normal to a direction of the fold line, the filter media further comprising:
a side band reinforcement strip disposed on the side edge.

14. The filter of claim 1 further comprising:
a tip band reinforcement strip disposed on the second plurality of pleat valleys.

15. The filter of claim 1 wherein the filter media further comprises a pair of opposite side edges and a pair of opposite end edges, the filter media further comprising:
a frame member positioned at each edge.

16. The filter of claim 15 wherein each frame member comprises a U-shaped channel which covers an edge and at least a portion of each of the front face and the rear face.

17. The filter of claim 1 further comprising:
a reinforcing member provided in contact with the rear face of the filter media.

18. The filter of claim 17 wherein the reinforcing member is substantially planar.

19. The filter of claim 18 wherein the planar reinforcing member is adhered to the rear face of the filter media.

20. The filter of claim 1 wherein the adhesive strand comprises a hot-melt adhesive.

21. The filter of claim 1 in which the adhesive strand is disposed substantially normal to a direction of a fold line.

22. A filter comprising:
a length of filter media having a minimum stiffness greater than 1.2 stiffness units and defining a front face and a rear face, wherein the filter media comprises a blown electret polypropylene microfiber material, the filter media having a plurality of pleats defined by a plurality of fold lines, each fold line being intermediate oppositely sloping first and second laterally planar wall surfaces, wherein the plurality of fold lines comprise a first plurality of pleat tips and a second plurality of pleat valleys; and
a continuous, substantially nonlinear adhesive strand provided on the front face of the filter media in continuous contact with the filter media, wherein the adhesive strand contacts the filter media at a pleat tip and contacts the filter media at a portion of a first wall surface and contacts the filter media at a portion of a second wall surface, the contacted pleat tip being formed and maintained as a sharp fold;

wherein the filter is characterized by the absence of a nonlinear adhesive strand in contact with the pleat valleys of the back face of the filter media.

23. The filter of claim 22 wherein a distance between a pleat tip and an adjacent pleat tip is between about 1.8 mm and about 12.6 mm.

24. The filter of claim 22 wherein a distance between a pleat tip and an adjacent pleat tip is between about 3.6 mm and about 27.0 mm.

25. The filter of claim 22 wherein a distance between a pleat tip and an adjacent pleat tip defines a pleat spacing, and wherein a ratio between pleat spacing and pleat height and is between about 0.1 and about 0.7.

26. The filter of claim 22 wherein a distance between a pleat tip and an adjacent pleat tip defines a pleat spacing, and wherein a ratio between pleat spacing and pleat height and is between about 0.2 and about 1.5.

27. The filter of claim 22 wherein a portion of the adhesive strand on a first wall surface contacts a portion of the adhesive strand on a second wall surface.

28. The filter of claim 22, further comprising a plurality of continuous adhesive strands.

29. The filter of claim 28, wherein the plurality of adhesive strands are positioned parallel to, and spaced apart from, each other.

30. The filter of claim 29, wherein an adhesive strand is spaced from an adjacent adhesive strand by between about 2.5 cm and about 12.7 cm.

31. The filter of claim 22 wherein the filter media further comprises a side edge, the side edge being substantially normal to a direction of the fold line, the filter media further comprising:

a side band reinforcement strip disposed on the side edge.

32. The filter of claim 22 further comprising:

a tip band reinforcement strip disposed on the second plurality of pleat valleys.

33. The filter of claim 22 wherein the filter media further comprises a pair of opposite side edges and a pair of opposite end edges, the filter media further comprising:

a frame member positioned at each edge.

34. The filter of claim 33 wherein each frame member comprises a U-shaped channel which covers an edge and at least a portion of each of the front face and the rear face.

35. The filter of claim 22 further comprising:

a reinforcing member provided in contact with the rear face of the filter media.

36. The filter of claim 35 wherein the reinforcing member is substantially planar.

37. The filter of claim 22 wherein the adhesive strand comprises a hot-melt adhesive.

38. The filter of claim 22 in which the adhesive strand is disposed substantially normal to a direction of a fold line.

39. A pleated filter comprising:

a folded filter media of nonwoven polymeric material, the filter media having a front face and a rear face, the filter media having a plurality of fold lines, each fold line being intermediate oppositely sloping first and second wall surfaces, wherein the plurality of fold lines comprise a first plurality of pleat tips and a second plurality of pleat valleys, wherein a distance between a pleat tip and an adjacent pleat tip is between about 4 mm and about 7 mm, the filter media further comprising a pair of opposite side edges and a pair of opposite end edges;

a plurality of continuous, substantially nonlinear adhesive strands provided on the front face of the filter media in discontinuous contact with the filter media;

wherein an adhesive strand contacts the filter media at a pleat tip, contacts the filter media along a majority of a length of each wall surface, and does not contact the filter media in a valley; wherein the plurality of strands are positioned parallel to, and spaced about 5.1 cm apart from, each other;

a metal mesh scrim adhered to the rear face of the filter media; and a frame member positioned at each edge, wherein each frame member comprises a U-shaped channel which covers an edge and at least a portion of each of the front face and the rear face.

40. The filter of claim 22 wherein the first and second laterally planar wall surfaces are non-parallel relative to one another.

41. The filter of claim 1, wherein the filter is configured for use with a commercial air purifier, and further wherein the blown microfiber media has a basis weight of about 20 g/m$^2$ to about 40 g/m$^2$.

42. The filter of claim 1, wherein the filter is configured for use with a commercial HVAC system and has a size selected from the group consisting of 24"×24", 12"×12", and 20"×30".

43. The filter of claim 1, wherein the filter media is softer than fiberglass.

44. A filter comprising:

a sheet of blown microfiber filter media having a minimum stiffness greater than 2 stiffness units, the filter media forming a front face, a back face, and a plurality of pleats defined by a plurality of fold lines, each fold line being intermediate oppositely sloping first and second wall surfaces, wherein the plurality of fold lines comprise a first plurality of pleat tips and a second plurality of pleat valleys; and a continuous, substantially nonlinear adhesive strand provided on the front face of the filter media in discontinuous contact with the filter media, wherein the adhesive strand contacts the filter media at the first plurality of pleat tips, along a majority length of each of the first wall surfaces, and along a majority length of each of the second wall surfaces;

wherein the adhesive strand assists in maintaining a pleat spacing of 3-6 pleats/inch.

* * * * *